United States Patent
Price Hoelscher et al.

(10) Patent No.: US 11,280,184 B2
(45) Date of Patent: Mar. 22, 2022

(54) METHODS OF DRILLING WITH RESISTIVITY TOOLS

(71) Applicant: M-I L.L.C., Houston, TX (US)

(72) Inventors: Brandi Katherine Price Hoelscher, Houston, TX (US); Cara Bovet, Houston, TX (US); Albert Okhrimenko, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 480 days.

(21) Appl. No.: 16/099,160

(22) PCT Filed: May 3, 2017

(86) PCT No.: PCT/US2017/030733
§ 371 (c)(1),
(2) Date: Nov. 5, 2018

(87) PCT Pub. No.: WO2017/192652
PCT Pub. Date: Nov. 9, 2017

(65) Prior Publication Data
US 2019/0179051 A1    Jun. 13, 2019

Related U.S. Application Data

(60) Provisional application No. 62/435,475, filed on Dec. 16, 2016, provisional application No. 62/435,384, (Continued)

(51) Int. Cl.
*E21B 49/00* (2006.01)
*E21B 21/00* (2006.01)
(Continued)

(52) U.S. Cl.
CPC ......... *E21B 49/00* (2013.01); *E21B 7/00* (2013.01); *E21B 21/003* (2013.01);
(Continued)

(58) Field of Classification Search
CPC combination set(s) only.
See application file for complete search history.

(56) References Cited

U.S. PATENT DOCUMENTS 2,717,239 A    9/1955    Fischer
2,749,503 A    6/1956    Henri-georges
(Continued)

FOREIGN PATENT DOCUMENTS

WO    2000041480 A2    7/2000
WO    2008083049 A2    7/2008
(Continued)

OTHER PUBLICATIONS

ISO 8942: 2020 "Rubber compoundng ingredients—Carbon black—Determination of individual pellet rushing strength" <https://www.iso.org/obp/ui/>, accessed Oct. 8, 2020.
(Continued)

*Primary Examiner* — Nabil H Syed
*Assistant Examiner* — Cal J Eustaquio
(74) *Attorney, Agent, or Firm* — Garry Brown, Jr.

(57) ABSTRACT

A method of electrically logging a section of a wellbore includes circulating an oil-based wellbore fluid comprising a conductive carbon material therein, the oil-based wellbore fluid having a conductivity of at most 0.01 S/m when measured at 20 kHz, within the wellbore while drilling the wellbore with a drill bit on a drill string; applying electrical current from a logging tool on the drill string above the drill bit; and collecting an electrical log of the portion of the wellbore that has had electrical current applied thereto.

22 Claims, 1 Drawing Sheet

Related U.S. Application Data filed on Dec. 16, 2016, provisional application No. 62/435,404, filed on Dec. 16, 2016, provisional application No. 62/435,454, filed on Dec. 16, 2016, provisional application No. 62/435,510, filed on Dec. 16, 2016, provisional application No. 62/331,317, filed on May 3, 2016, provisional application No. 62/331,332, filed on May 3, 2016, provisional application No. 62/331,298, filed on May 3, 2016.

(51) Int. Cl.
| | | |
|---|---|---|
| *E21B 7/00* | (2006.01) | |
| *E21B 33/138* | (2006.01) | |
| *E21B 47/00* | (2012.01) | |
| *E21B 47/12* | (2012.01) | |
| *E21B 47/01* | (2012.01) | |

(52) U.S. Cl.
CPC ............ *E21B 33/138* (2013.01); *E21B 47/00* (2013.01); *E21B 47/01* (2013.01); *E21B 47/12* (2013.01)

(56) References Cited

U.S. PATENT DOCUMENTS

| | | | |
|---|---|---|---|
| 3,559,735 | A | 2/1971 | Corrin |
| 5,080,773 | A | 1/1992 | Tatum |
| 5,902,517 | A | 5/1999 | Thielen |
| 6,770,603 | B1 | 8/2004 | Sawdon et al. |
| 2004/0116303 | A1 | 6/2004 | Thaemlitz |
| 2006/0225880 | A1 | 10/2006 | Radzinski et al. |
| 2008/0173481 | A1 | 7/2008 | Menezes et al. |
| 2010/0126252 | A1 | 5/2010 | Bailey et al. |
| 2011/0111988 | A1 | 5/2011 | Ionescu Vasii et al. |
| 2011/0254553 | A1* | 10/2011 | van Zanten ............ C09K 8/32 324/366 |
| 2012/0131996 | A1 | 5/2012 | Anish et al. |
| 2013/0030707 | A1 | 1/2013 | Tabarovsky et al. |
| 2013/0112409 | A1 | 5/2013 | Baleno et al. |
| 2015/0284619 | A1 | 10/2015 | Price Hoelscher et al. |
| 2015/0368539 | A1 | 12/2015 | Tour et al. |
| 2016/0017201 | A1 | 1/2016 | Yang |
| 2016/0356919 | A1* | 12/2016 | Jamison ................ C09K 8/80 |
| 2017/0096593 | A1* | 4/2017 | Step ..................... C09C 1/56 |

FOREIGN PATENT DOCUMENTS

| | | |
|---|---|---|
| WO | 2011050061 A2 | 4/2011 |
| WO | 2014066295 A1 | 5/2014 |
| WO | 2015148793 A1 | 10/2015 |
| WO | 2016014512 A1 | 1/2016 |
| WO | 2016014525 A1 | 1/2016 |
| WO | 2017192642 A1 | 11/2017 |
| WO | 2017192646 A1 | 11/2017 |
| WO | 2017192656 A1 | 11/2017 |

OTHER PUBLICATIONS

Office Action issued in U.S. Appl. No. 16/097,825 dated Oct. 14, 2020, 17 pages.
International Search Report issued in PCT/US2017/030727 dated Aug. 17, 2017 (2 pages).
Written Opinion of the International Searching Authority issued in PCT/US2017/030727 dated Aug. 17, 2017 (14 pages).
International Search Report issued in PCT/US2017/030733 dated Aug. 17, 2017 (2 pages).
Written Opinion of the International Searching Authority issued in PCT/US2017/030733 dated Aug. 17, 2017 (11 pages).
International Search Report and Written Opinion issued in International patent application PCT/US2017/030719 dated Aug. 10, 2017, 11 pages.
International Preliminary Report on Patentability issued in International patent application PCT/US2017/030719 dated Nov. 6, 2018, 11 pages.
International Preliminary Report on Patentability issued in International patent application PCT/US2017/030727 dated Nov. 15, 2018, 15 pages.
International Preliminary Report on Patentability issued in International patent application PCT/US2017/030733 dated Nov. 6, 2018, 12 pages.
International Search Report and Written Opinion issued in International patent application PCT/US2017/030740 dated Aug. 16, 2017, 11 pages.
International Preliminary Report on Patentability issued in International patent application PCT/US2017/030740 dated Nov. 6, 2018, 7 pages.
Office Action issued in U.S. Appl. No. 16/097,821 dated Dec. 1, 2020, 8 pages.
Notice of Allowance issued in U.S. Appl. No. 16/097,825 dated Jul. 9, 2021, 12 pages.
Exam Report letter issued in United Kingdom Patent Application No. GB1819688.1 dated Jul. 20, 2021, 5 pages.

\* cited by examiner

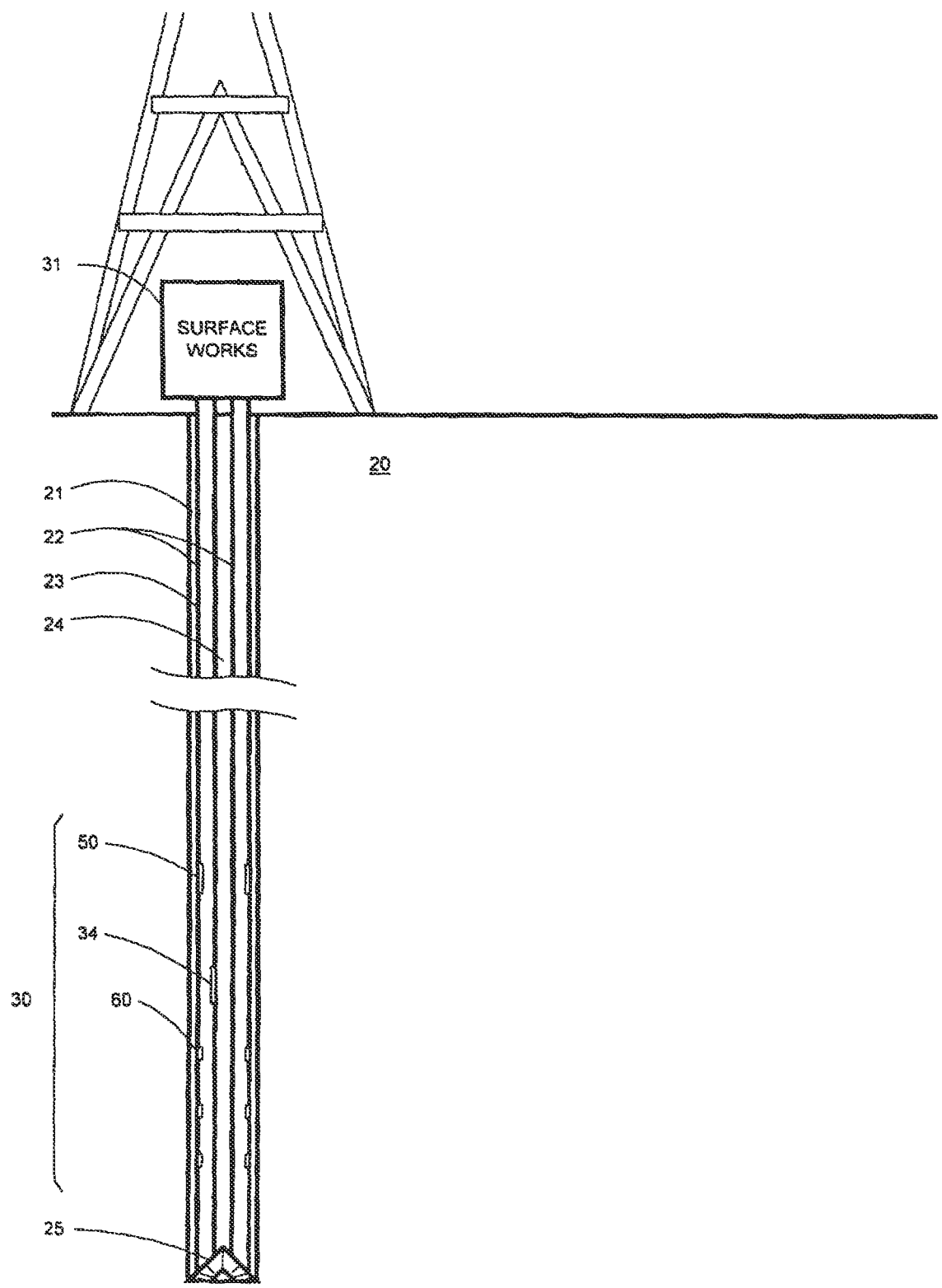

METHODS OF DRILLING WITH RESISTIVITY TOOLS

BACKGROUND

In the process of rotary drilling a well, a wellbore fluid or mud is circulated down the rotating drill pipe, through the bit, and up the annular space between the pipe and the formation or steel casing, to the surface. The wellbore fluid performs many different functions. For example, it removes cuttings from the bottom of the hole to the surface, suspends cuttings and weighting material when the circulation is interrupted, controls subsurface pressure, isolates the fluids from the formation by providing sufficient hydrostatic pressure to prevent the ingress of formation fluids into the wellbore, cools and lubricates the drill string and bit, maximizes penetration rate, etc. An important objective in drilling a well is also to secure the maximum amount of information about the type of formations being penetrated and the type of fluids or gases in the formation. This information is obtained by analyzing the cuttings and by electrical logging technology and by the use of various downhole logging techniques, including electrical measurements.

Various logging and imaging operations are performed during or after the drilling operation, for example, they may be performed while drilling in the reservoir region of an oil/gas well in order to determine the type of formation and the material therein. Such information may be used to optimally locate the pay zone, i.e., where the reservoir is perforated in order to allow the inflow of hydrocarbons into the wellbore. The use of wireline well logs is well known in the art of drilling subterranean wells and in particular oil and gas wells. A wireline log is generated by lowering a logging tool down the well on a wireline. The tool is slowly brought back to the surface and the instruments on the logging tool take measurements that characterize the formation penetrated by the well in addition to other important properties of the well. For example, during logging wireline logs may use measurements of relative resistivity of the formation to determine the geological composition of the downhole formation. An alternative or supplement to wireline logging involves logging tools placed in a specialized drill collar housing and run in the drill string near the bit. This technique is known as logging-while-drilling (LWD) or formation-evaluation-while-drilling (FEWD). Measurements such as electrical resistivity may be thereby taken and stored downhole for later retrieval during a "tripping out" of the drill string, or transmitted to the surface via mud-pulse telemetry. Also, during drilling, such resistivity measurements may be useful to determine the location of the drill bit to enhance geosteering capabilities and directional drilling control, collected such as by a measurement while drilling (MWD) tool. Thus, electrical logs and other wireline log techniques are depended upon in the oil and gas exploration industry to determine the nature of the geology and the reservoir properties of the petroleum bearing formations penetrated by the well, as well as other properties of the drilling process (e.g., the location of the drill bit). Further, such well logs are often the only record of a formation penetrated by a well that are available for correlation amongst different wells in a particular field.

SUMMARY

In one aspect, embodiments disclosed herein relate to a method of electrically logging a section of a wellbore, which may include circulating an oil-based wellbore fluid comprising a conductive carbon material therein, the oil-based wellbore fluid having a conductivity of at most 0.01 S/m when measured at 20 kHz, within the wellbore while drilling the wellbore with a drill bit on a drill string; applying electrical current from a logging tool on the drill string above the drill bit; and collecting an electrical log of the portion of the wellbore that has had electrical current applied thereto.

In another aspect, embodiments disclosed herein relate to a system for electrically logging a section of a wellbore, which may include a wellbore containing an oil-based wellbore fluid comprising a conductive carbon material therein, the oil-based wellbore fluid having a conductivity of at most 0.01 S/m when measured at 20 kHz; and a logging tool capable of applying an electrical current to a portion of the wellbore on a drill string above the drill bit, the drill string being in the wellbore.

BRIEF DESCRIPTION OF DRAWINGS

FIG. 1 is a schematic of a wellbore and a tool that may be used in accordance with certain aspects of the present disclosure.

DETAILED DESCRIPTION

Embodiments disclosed herein generally relate to methods of using wellbore logging, and more specifically resistivity tools, to interrogate wellbores having electrically conductive oil-based wellbore fluids therein. In particular, one or more embodiments disclosed herein relate to methods of using resistivity tools to interrogate wellbores having conductive oil-based fluids comprising electrically conductive carbon materials, thereby allowing for improved clarity and resolution during the electrical logging of the subterranean well.

In the present disclosure, certain details are set forth such as specific quantities, concentrations, sizes, etc. so as to provide a thorough understanding of the various embodiments disclosed herein. However, it will be apparent to those skilled in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

While most of the terms used herein will be recognizable to those of skill in the art, the following definitions are nevertheless put forth to aid in the understanding of the present disclosure. It should be understood, however, that when not explicitly defined, terms should be interpreted as adopting a meaning presently accepted by those of skill in the art.

When an electrical log is made of a well while drilling, electrodes on the well logging tool mounted on the drill string above the drill bit are conventionally in contact with the wellbore fluid and hence the formation rocks through which the well has penetrated. An electrical circuit is created and the resistance and other electrical properties of the circuit may be measured while the logging tool is withdrawn from the well. In conventional wellbore logging, the measurement of resistivity requires the presence of a highly conductive path between the logging tool and the formation (i.e., through the wellbore fluid). The resulting data is a measure of the electrical properties of the drilled formations versus the depth of the well. The results of such measurements may be interpreted to determine the presence or absence of petroleum or gas, the porosity of the formation rock, and other important properties of the well.

The use of oil-based muds and wellbore fluids has become increasingly popular since the introduction of the technology in the 1950's. However, one disadvantage of oil-based muds is that normal resistivity and self-potential measurements cannot be taken when the well has been drilled with a conventional oil-based mud or wellbore fluid due to the non-conductive nature of the oil-based wellbore fluids and muds.

Thus, the use of resistivity logging tools is often limited to cases where a water-based wellbore fluid is used for the drilling operations because the low conductivity of the fluid produced by the base-oil in the case of oil/synthetic-base wellbore fluids severely limits the amount and clarity/resolution of resistivity information that may be gathered from a wellbore using wireline logging. The case is similarly true for invert emulsion wellbore fluids, since when invert emulsion fluids are used, any electrical path through the fluid is resistive due to the nature of the external oil phase. In other words, even though the brine dispersed in the oil phase is electrically conductive, the discontinuous nature of the droplets prevents the flow of electricity. Indeed, the inability of these emulsions to conduct electricity (until a very high potential difference is applied) is used as a standard test of emulsion stability. Thus, the resistive nature of invert emulsion wellbore fluids generally limits the amount and clarity/resolution of resistivity information that may be gathered from a wellbore using wireline logging.

However, the addition of conductive additives, such as the carbon materials detailed below, may allow for an increase in the conductivity of the oil-based wellbore fluid that is sufficient to facilitate wellbore logging via resistivity measurements. In one or more embodiments, the resistivity measurements may be collected using a logging tool attached in-line with the drill string at a position above the drill bit, with the resistivity measurements being obtained through the oil-based wellbore fluid that has conductive additives therein.

In one or more embodiments of the present disclosure a conductive oil-based wellbore fluid may be circulated within the wellbore during drilling, which allows for resistivity measurements to be taken through the use of particular types of resistivity tools. By collecting the measurements during drilling, operators avoid the time and cost necessary to trip out the drill string after drilling to emplace a separate tool to acquire the resistivity logs. Referring now to FIG. 1, a schematic of a wellbore and tool that may be used in accordance with certain aspects of the present disclosure is shown.

During drilling of a formation, the borehole contains a drill string immersed in drilling mud. FIG. 1 shows earth formation 20 with a borehole 21 therein. Borehole 21 encloses drill string 22. Drill string 22 defines drill string 22 outer surface 23 and mud channel 24. LWD tool 30 is mounted and connected in-line with the drill string 22 above the drill bit 25 and includes electrodes (one labeled as 60) to apply an alternating current through formation to a return electrode(s), which may also be located on the LWD tool 30. As the current emerges from the electrodes on the LWD tool 30, its path is initially focused through the wellbore fluid and on the small volume of earth formation 20 directly facing the respective electrodes but expands rapidly, in a magnitude dependent upon the properties of the earth formation 20, through the wall of the borehole 21 and across the formation between the electrodes on the LWD tool 30 and the return electrode(s). These measurements occur continuously as the LWD tool 30 moves through the borehole 21 along with the drillstring 22. These measurements may be called microresistivity measurements because they measure the electrical resistivity of very small vertical segments of the borehole 21 and earth formation 20 structure. A LWD tool 30 may also include a transmitter 50 for transmitting collected data to the surface and a receiver 34 for receiving input/instructions from an operator at the surface. Surface works 31 includes drill string support and drive mechanisms (not shown). Batteries or mud motor (not shown) in tool 30 provide electrical power to the tool itself and the transmitter 50 and receiver 34.

As will be understood by a skilled artisan, the formation testing tool shown in FIG. 1 may be configured in a variety of ways and have a variety of different components. Its inclusion here is not meant to limit the scope of the application in any way and is only intended to represent the basics of the process of obtaining an electrical log or resistivity measurement in a wellbore by using a LWD tool.

To be clear, methods for using resistivity tools to interrogate formations that have been drilled with non-conductive oil-based wellbore fluids do exist, but the non-conductivity of oil-based wellbore fluids severely limits the amount and clarity/resolution of resistivity information that may be gathered from a wellbore using LWD tools. For example, where the measured current(s) at the sensor electrode(s) is used directly to measure resistivity, for a non-conductive oil-based wellbore fluid environment, the circuit frequency is in the 10 MHz to 100 MHz range in order to overcome the insulating nature of the conventional oil-based wellbore fluid, which limits the amount of current that can reach the formation to properly measure the formation properties. In contrast, for a water-based wellbore fluid environment, the fluid is inherently conductive because it contains salts dissolved in the water and the current can penetrate the filtercake and formation easily. Thus, for a water-based and conductive wellbore fluid environment, the circuit frequency is around only 5 KHz, although the circuit can be operated at the higher frequencies needed for the oil-based wellbore fluid environment. Thus, by formation of a conductive oil-based wellbore fluid, the circuit frequency may be less than the 10 MHz needed for a non-conductive oil-based wellbore fluid environment.

In some embodiments, the methods may include placing conductive oil-based wellbore fluids into the subterranean well, including oil-based fluids such as invert emulsions. Thus, embodiments of the present disclosure may allow for the formation of a conductive oil-based wellbore fluid that enables electrical logging to acquire data having high levels of clarity and resolution. Specifically, the oil-based wellbore fluids may include one or more carbon materials of the present disclosure in a concentration so as to permit or improve the electrical logging of the well by increasing the electrical conductance of the wellbore fluid. In such embodiments, the oleaginous-based wellbore fluids of the present disclosure may be formulated with conductive carbon additives so as to enable one to take electrical log measurements of the subterranean well, despite the naturally low conductivity of conventional oil-based wellbore fluids.

In some embodiments, during logging and while using oil-based wellbore fluids and carbon materials as described herein, LWD tools may be used to take measurements of relative resistivity of the formation. As discussed above, the measurements of relative resistivity of the formation may be used to determine the geological composition of the downhole formation. Also, such resistivity measurements may optionally be useful to determine the location of the drill bit to enhance geosteering capabilities and directional drilling control. In some embodiments, the wellbore fluids and carbon materials disclosed herein may be used with drilling systems having a logging tool provided thereon so that the drilling and formation data and parameters may be determined from various downhole measuring devices and may be measured and then transferred to the surface.

In other embodiments, the measurements may be stored downhole for subsequent retrieval, or they may be both transferred via telemetry to the surface and/or stored downhole. In some embodiments, measurements may be depth-correlated, using depth measurements made downhole for improving accuracy of the measurements and the parameters of interest. In additional embodiments, the measurements and/or parameters may be correlated with stored reference data for providing additional information pertaining to the drilling operations and the formation characteristics. Thus, the logging measurements may be used to determine the drill bit location relative to the desired drilling path and to adjust the drilling activity downhole. Thus, these electrical logs and other logging techniques may determine the nature of the geology and the reservoir properties of the petroleum bearing formations penetrated by the well, as well as other properties of the drilling process (e.g., the location of the drill bit).

Wellbore Fluids with Carbon Materials

The oil-based wellbore fluids of the present disclosure may include fluids that are substantially comprised of an oleaginous liquid, as well as emulsions of oleaginous and non-oleaginous fluids. In particular, various embodiments of the present disclosure may provide for an invert emulsion wellbore fluid. "Invert emulsion," as used herein, is an emulsion in which a non-oleaginous fluid is the discontinuous phase and an oleaginous fluid is the continuous phase.

"Oleaginous liquid," as used herein, means an oil which is a liquid at 25° C. and is immiscible with water. Oleaginous liquids may include substances such as hydrocarbons used in the formulation of drilling fluids such as diesel oil, mineral oil, synthetic oil (including linear alpha olefins and internal olefins), ester oils, glycerides of fatty acids, aliphatic esters, aliphatic ethers, aliphatic acetals, or other such hydrocarbons and combinations of these fluids.

"Non-oleaginous liquid," as used herein, means any substance that is a liquid at 25° C. and that is not an oleaginous liquid as defined above. Non-oleaginous liquids are immiscible with oleaginous liquids but capable of forming emulsions therewith. Non-oleaginous liquids may include aqueous substances such as fresh water, sea water, brine containing inorganic or organic dissolved salts, aqueous solutions containing water-miscible organic compounds and mixtures of these.

In the process of rotary drilling a well, a wellbore fluid or mud is circulated down the rotating drill pipe, through the bit, and up the annular space between the pipe and the formation or steel casing, to the surface. The wellbore fluid performs many different functions. For example, it removes cuttings from the bottom of the hole to the surface, suspends cuttings and weighting material when the circulation is interrupted, controls subsurface pressure, isolates the fluids from the formation by providing sufficient hydrostatic pressure to prevent the ingress of formation fluids into the wellbore, cools and lubricates the drill string and bit, maximizes penetration rate, etc. An important objective in drilling a well is also to secure the maximum amount of information about the type of formations being penetrated and the type of fluids or gases in the formation. This information is obtained by analyzing the cuttings and by electrical logging technology and by the use of various downhole logging techniques, including electrical measurements.

Various logging and imaging operations are performed during the drilling operation, for example, they may be performed after drilling sections in the reservoir region of an oil/gas well in order to determine the type of formation and the material therein. Such information may be used to optimally locate the pay zone, i.e., where the reservoir is perforated in order to allow the inflow of hydrocarbons into the wellbore.

Some logging tools work on the basis of a resistivity contrast between the fluid in the wellbore (wellbore fluid) and that already in the formation. These are known as resistivity logging tools. Briefly, alternating current flows through the formation between two electrodes. Thus, the fluids in the path of the electric current are the formation fluids and the fluid that has penetrated the formation by way of filtration. The filtercake and filtrate result from filtration of the mud over a permeable medium (such as formation rock) under differential pressure.

The use of resistivity logging tools is often limited to cases where a water-based wellbore fluid is used for the drilling operations because the low conductivity of the base-oil in the case of oil/synthetic-base wellbore fluids precludes the use of resistivity tools in such fluids. The case is similarly true for invert emulsion wellbore fluids, since when invert emulsion fluids are used, any electrical path through the fluid is insulated due to the non-conductive nature of the external oil phase. In other words, even though the brine dispersed in the oil phase is electrically conductive, the discontinuous nature of the droplets prevents the flow of electricity. Indeed, the inability of these emulsions to conduct electricity (until a very high potential difference is applied) is used as a standard test of emulsion stability. The non-conductive nature of invert emulsion wellbore fluids severely limits the amount and clarity of resistivity information that may be gathered from a wellbore using wireline logging.

In some embodiments, the methods may include placing oil-based wellbore fluids into the subterranean well, including oil-based fluids such as invert emulsions, and forming a conductive filtercake on the wellbore walls. Embodiments of the present disclosure may allow for formation of a conductive filtercake that enables electrical logging even if the fluid from which the filtercake is formed is not conductive at a level that permits logging. Specifically, the oil-based wellbore fluids may include one or more carbon materials of the present disclosure in a concentration so as to permit or improve the electrical logging of the well by increasing the electrical conductance of the filtercake. Thus, embodiments include the drilling of a subterranean well with an oleaginous-based wellbore fluid described herein so as to allow formation of a conductive filtercake by filtration of a portion of the fluid phase into a permeable formation. In such embodiments, the oleaginous-based wellbore fluids of the present disclosure may be formulated so as to enable one to take electrical log measurements of the subterranean well, despite the naturally low conductivity of the fluid.

In some embodiments, during logging and while using oil-based wellbore fluids and carbon materials as described herein, logs may be used to take measurements of relative resistivity of the formation. The measurements of relative resistivity of the formation may be used to determine the geological composition of the downhole formation. In some embodiments, the wellbore fluids and carbon materials disclosed herein may be used with drilling systems having a logging tool provided thereon so that the drilling and formation data and parameters may be determined from various downhole measuring devices and may be measured and then transferred to the surface.

Carbon Materials

While there have been previous attempts to increase the conductivity of an oil-based fluid, such attempts heretofore have resulted in fluids that are not, in fact, usable in a drilling application. Specifically, in some instances, the loading requirements for the conductive particles exceeded pumpability/rheological requirements, while in others, the particles failed to disperse and remain suspended in the fluid. In contrast, the present inventors have advantageously found that the inclusion of the carbon materials of the present disclosure may allow for formation of a conductive wellbore fluid and/or a conductive filtercake at particle loading levels that enable formulation of a wellbore fluid that meets the rheological profile window suitable for use in drilling. Furthermore, it is also envisioned that the same or similar results may be achieved with non-carbon materials with characteristics similar to those detailed below but formed of other elements or having a composition that contains elements other than carbon. However, in particular embodiments of the present disclosure, the fluid may incorporate one or more carbon materials in a wellbore fluid in such an amount that the oil-based filtercake formed therefrom is electrically conductive. Further, it is also envisioned that such materials may be added in an amount to also make the fluid itself conductive, which might be used, for example, in low permeability formations that have minimal filtercake formed. In one or more embodiments, at least two grades of carbon materials, each having different characteristics (e.g., particle size, surface area, pore volume, surface chemistry, etc.) may be used in wellbore fluids of the present disclosure in order to render the wellbore fluid itself or a filtercake formed therefrom conductive. The carbon materials described herein may be added to any oil-based wellbore fluid, or a custom wellbore fluid formulation may be prepared.

Carbon materials in accordance with embodiments of the present disclosure may be carbon black, a particulate form of carbon that has high surface area and only short to medium range intraparticulate ordering (i.e., paracrystalline ordering) of a graphite-like carbon lattice, and in particular the materials may be conductive carbon black. Generally, carbon black may have a morphology that includes primary aggregates of a plurality of primary particles. Specifically, carbon black aggregates are characterized as discrete and rigid masses of physically fused primary particles. These primary aggregates may be provided in the form of larger agglomerates which are subsequently broken down into the primary aggregates upon shearing during the formulation into the wellbore fluids of the present disclosure.

The electron transport between primary aggregates (and thus conductivity) may occur when the distance between the primary aggregates is short enough to form conductive paths allowing electron transport. Increasing particle loading would eventually result in particle-to-particle contact and thus greater conductivity by virtue of the physical contact between particles; however, contrary to this conventional wisdom, the inventors of the present disclosure have found that a conductive fluid and/or a conductive filtercake may be formed from a lower particle loading, which allows for formulation of a fluid that meets downhole drilling requirements. Some of the primary parameters that impact the conductivity efficiency (and ability to achieve conductivity in the fluid and/or the filtercake at a lower loading) include, for example, primary particle size, structure, and porosity. Both particle size and porosity impact surface area. The inventors of the present application have found that by increasing the porosity and the surface area, greater conductivity efficiency (and lower particle loading) may be achieved.

Specifically, in one or more embodiments, the carbon black materials of the present disclosure may be added to the wellbore fluid (and result in a conductive filtercake) in a total amount that ranges from about 0.5 to 30 pounds per barrel (1.43 to 85.59 kg/m$^3$, or in a total amount from about 1 to 25 pounds per barrel (2.85 to 71.33 kg/m$^3$), or in a total amount from about 1.5 to 20 pounds per barrel (4.275 to 57.06 kg/m$^3$). In more particular embodiments, the carbon black materials of the present disclosure may be added to the wellbore fluid (and result in a conductive filtercake) in a total amount that range from about 1 to 8 pounds per barrel (2.85 to 22.8 kg/m$^3$) or in a total amount from about 1.5 to 7.0 pounds per barrel (4.275 to 21.375 kg/m$^3$), or in a total amount from about 2 to 6 pounds per barrel (5.71 to 17.12 kg/m$^3$). Generally, the inventors have found that when working within lower permeability formations a higher loading level of carbon black materials may be needed to achieve the necessary logging conditions.

As mentioned above, the carbon black aggregates may be formed from a plurality of physically fused primary particles. In one or more embodiments, the primary particles are non-spheroidal and in fact, have an egg-shell particle form that is similar to an open shell or a hollow shell. For example, the interior of the shell may be completely enclosed by the shell or there may only be a partial shell surrounding the interior. The "effective" diameter of the carbon black primary particles may be from about 5 nm to about 150 nm or from about 20 nm to about 115 nm.

The primary particles fuse together during production of the carbon black in the oven/furnace to form aggregates that may have a branched and fibroid-like structure, which may further entangle to form the agglomerate. In one or more embodiments, a circumscribing sphere encompassing a carbon black aggregate of the present disclosure may have a diameter from about 60 nm to 3 micrometers. In one or more embodiments, a circumscribing sphere encompassing a carbon black agglomerate of the present disclosure may have a diameter between about 1 micrometers and 5 millimeters in size.

The branched and fibroid-like structure (as well as egg-shell primary particle structure) may result in a relatively high pore volume, particular when considering the size of the aggregates. In one or more embodiments, a carbon black according to the present disclosure may have a pore volume, when measured using Di-Butyl-Phthalate (DBP) absorption method, of at least about 200 cm$^3$ DBP/100 g carbon black and up to about 500 cm$^3$ DBP/100 g carbon black. Carbon black aggregates with these values have a low bulk density and a highly branched structure, which may serve to provide better contact between aggregates and therefore a better three dimensional network of conductive aggregates at lower loadings in a filtercake (and thus a fluid that forms the filtercake).

The egg-shell primary particle structure also contributes to a higher surface area for the aggregates. In one or more embodiments, the carbon black may have a surface area between about 125 and 1,500 m$^2$/g. In more particular embodiments, the carbon black may have a surface area of at least about 200 m$^2$/g, or at least about 500 m$^2$/g, or at least about 700 m²/g, or at least about 800 m²/g, or at least about 900 m²/g, or at least about 1,000 m²/g, or at least about 1,100 m²/g, or at least about 1,200 m²/g, or at least about 1,300 m²/g, or at least about 1,400 m²/g and/or up to 1,500 m²/g.

Collectively, the high pore volume and high surface area may allow for greater conductivity efficiency. This efficiency may be represented by the value of the loading multiplied by the surface area of the carbon materials, a number which may be hereinafter referred to as the "surface area loading factor". In one or more embodiments, wellbore fluids of this disclosure have a value of the loading (in pounds per barrel) multiplied by the surface area (in m²/g) of the carbon materials of at least 2,000 lbm²/gbbl, or at least 2,250 lbm²/gbbl, or at least 2,500 lbm²/gbbl, or at least 2,750 lbm²/gbbl, or at least 3,000 lbm²/gbbl. In one or more embodiments, wellbore fluids of this disclosure have a value of the loading (in pounds per barrel) multiplied by the surface area (in m²/g) of the carbon materials of at most 4,500 lbm²/gbbl, or at most 4,000 lbm²/gbbl. Such a "surface area loading factor" is dependent on both the surface area and loading, and thus theoretically can be achieved by simply increasing the loading. However, as discussed above, the carbon black materials of the present disclosure may be added to the wellbore fluid in a total amount as low as 1 pound per barrel (2.85 kg/m³) with a maximum amount of up to 30 pounds per barrel (85.59 kg/m³), or a maximum amount up to 25 pounds per barrel (71.33 kg/m³), or a maximum amount up to 20 pounds per barrel (57.06 kg/m³), or a maximum amount up to 15 pounds per barrel (42.8 kg/m³), or a maximum amount up to about 10 pounds per barrel (28.53 kg/m³). In more particular embodiments, the carbon black materials of the present disclosure may be added to the wellbore fluid (and result in a conductive fluid and/or filtercake) in a total amount that ranges from about 1 to 8 pounds per barrel (2.85 to 22.8 kg/m³) or in a total amount from about 1.5 to 7.5 pounds per barrel (4.275 to 21.375 kg/m³). It is envisioned that the surface area loading factor discussed above is achieved through the combination of these loading limits and the above discussed surface area limitations. Specifically, as discussed above, in one or more embodiments, the carbon black may have a surface area between about 125 and 1,500 m²/g. In more particular embodiments, the carbon black may have a surface area of at least about 200 m²/g, or at least 500 m²/g, or at least 700 m²/g, or at least about 800 m²/g, or at least about 900 m²/g, or at least about 1,000 m²/g, or at least about 1,100 m²/g, or at least about 1,200 m²/g, or at least about 1,300 m²/g, or at least 1,400 m²/g and/or up to 1,500 m²/g.

The surface chemistry of the carbon black may also play a role in their potential conductive properties. Most carbon blacks are known to have surfaces that contain organic surface groups including polyaromatic hydrocarbons (PAH), lactones, chinones, phenolics, and carboxylics, which may be otherwise known as 'volatiles'. Too high of a concentration of these volatiles may act as a barrier for the electron-tunneling effect thought to provide the electroconductivity. In one or more embodiments, carbon black used in the wellbore fluids of the present disclosure may have a volatile content below about 1% by weight, or below about 0.85% by weight, or below about 0.7% by weight.

As mentioned above, the wellbore fluid containing conductive carbon materials may not be as conductive as a filtercake that it forms when used downhole due to the dilution of the carbon materials. For example, when a wellbore fluid is used downhole, a portion of the fluid filters into the formation as a filtrate leaving behind some of the solid or semi-solid materials from the wellbore fluid (e.g., particulate weighting materials, bridging agents, fibers, polymers, etc.) on the face of the formation as a filtercake with some amount of the fluid phase present therein. Thus, as a wellbore fluid containing carbon materials filters into the formation, the carbon materials, being solid, will tend to accumulate in the filtercake that is formed on the formation face. This accumulation may effectively concentrate the conductive carbon materials to a degree where conductivity would exist within the filtercake, where it did not exist in the wellbore fluid itself due to its dilution in the fluid.

In one or more embodiments, the wellbore fluid may have a conductivity of at most 0.02 siemens per meter (S/m), or at most 0.01 S/m, or at most 0.0075 S/m, or at most 0.001 S/m when measured at 20 kHz. In one or more embodiments, the wellbore fluid is at least about 100 times less, or at least about 500 times less, or at least about 1,000 times, or at least about 1,500 times less, or at least about 2,000 times less, or at least about 2,500 times less, or at least about 3,000 times less conductive than a filtercake produced from the filtration of said wellbore fluid into the formation. In one or more embodiments, the conductivity of the wellbore fluid may be at most 100,000 times less than a filtercake produced from the filtration of said wellbore fluid into the formation. Said another way, the wellbore fluid is at least about 100, 500, 1,000, 1,500, 2,000, 2,500, or 3,000 times more resistive than a filtercake produced from the filtration of said wellbore fluid into the formation. Further, it is also appreciated that the conductivity/resistivity of a wellbore fluid and/or filtercake may be considered relative to the formation (and the formation fluids) behind the filtercake so that there is enough contrast between the two materials that can be recognized by the logging tool. For example, in one or more embodiments, resistivity logging tools operating at frequencies less than about 50 kHz may provide suitable imaging data when there is up to a 100 fold difference between the resistivity/conductivity of the wellbore fluid and/or filtercake formed on the formation and the formation itself, i.e., the filtercake is up to 100 times more resistive than the formation. However, when using other tools at other operating frequencies or depending on the desired level of image quality, different ranges may be used.

Further, it is relevant that the conductivity exists in the wellbore fluid and/or filtercake without breaking the emulsion. Breaking of the emulsion would independently result in conductivity due to the availability of the aqueous saline phase broken free from the emulsion. However, from a fluid stability perspective, it is not desirable for the emulsion to break (or the mud to fall apart) downhole during drilling and formation of the filtercake. Thus, in one or more embodiments, the filtrate collected from an API HPHT Fluid Loss test on the wellbore fluids of the present disclosure is substantially free of separated water (as compared to emulsified water). Specifically, in one or more embodiments, the filtrate has less than 10 percent of the portion of water in the fluid phase separate following an API HPHT Fluid Loss Test. That is, for an invert emulsion that is 80% oil and 20% water, less than 10% of the 20% water portion may phase separate from the emulsion. In more specific embodiments, the amount of phase separated non-oleaginous fluid in the filtrate is less than about 5% by volume of the amount of non-oleaginous fluid in the original wellbore fluid. Further, it is noted that the API HPHT Fluid Loss test may have at least 1 mL of filtrate collected, which may indicate that a filtercake is formed. In one or more embodiments, the conductivity arises through the formation of a filtercake and therefore, the formation in which the fluid is used should have a permeability at least in the millidarcy range to ensure that a filtercake forms during the wellbore operations. Further, drilling in an overbalanced condition may also aid in formation of a filtercake, depending on the permeability of the formation.

However, some shales have a permeability in the nano-darcy range and a substantial filtercake may not be expected to form during wellbore operations. In these situations and other situations where it would be beneficial for the wellbore fluid itself to be sufficiently conductive for logging, a higher loading (i.e., greater than about 10 pounds per barrel) of carbon materials may be used in the wellbore fluid to increase the conductivity of the fluid itself and thereby enable effective resistivity imaging.

The rheological profile of the fluid is impacted by the degree of loading of the carbon materials. Fluids having carbon materials of the present disclosure incorporated therein may result in sufficient electrical conductivity for the wellbore fluid and/or filtercake while also arriving at acceptable rheological properties for drilling (and pumping downhole). One of ordinary skill in the art will appreciate that the precise rheological profile of a drillable fluid may depend on the formation (whether the formation can tolerate a thicker mud without fracturing), but generally, the fluids having the described carbon black loading may have a plastic viscosity of about 15-70 cP and yield point of less than about 35 lb/100 ft$^2$. Further, the fluid may also have a GELS value ranging from 5-20 lb/100 ft$^2$, the GELS being a measure of the suspending characteristics or the thixotropic properties of a fluid, measured after 10 seconds and/or 10 minutes.

As mentioned above, wellbore fluids described herein may be oil-based wellbore fluids or invert emulsions in one or more embodiments. Suitable oil-based or oleaginous fluids may be a natural or synthetic oil and in some embodiments, in some embodiments the oleaginous fluid may be selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof.

Non-oleaginous liquids may, in some embodiments, include at least one of fresh water, sea water, brine, mixtures of water and water-soluble organic compounds, and mixtures thereof. In various embodiments, the non-oleaginous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The amount of oleaginous liquid in the invert emulsion fluid may vary depending upon the particular oleaginous fluid used, the particular non-oleaginous fluid used, and the particular application in which the invert emulsion fluid is to be employed. However, in some embodiments, the amount of oleaginous liquid may be sufficient to form a stable emulsion when used as the continuous phase. In some embodiments, the amount of oleaginous liquid may be at least about 30, or at least about 40, or at least about 50 percent by volume of the total fluid. The amount of non-oleaginous liquid in the invert emulsion fluid may vary depending upon the particular non-oleaginous fluid used and the particular application in which the invert emulsion fluid is to be employed. In some embodiments, the amount of non-oleaginous liquid may be at least about 1, or at least about 3, or at least about 5 percent by volume of the total fluid. In some embodiments, the amount may not be so great that it cannot be dispersed in the oleaginous phase. Therefore, in certain embodiments, the amount of non-oleaginous liquid may be less than about 70, or less than about 60, or less than about 50 percent by volume of the total fluid.

Wellbore Fluid Additives

The wellbore fluids of the present disclosure may further contain additives so long as the additives do not interfere with the properties of the compositions described herein. For example, emulsifiers, wetting agents, organophilic clays, viscosifiers, weighting agents, bridging agents, fluid loss control agents, and corrosion inhibitors may be added to the compositions disclosed herein so as to impart additional functional properties.

Wetting agents and emulsifiers that may be suitable for use include, but are not limited to, crude tall oil, oxidized crude tall oil, surfactants, organic phosphate esters, ether carboxylic acids, fatty amines, amidoamines, modified imidazolines and amidoamines, fatty acid amidoamines (including dry fatty acid amidoamines) and salts thereof, alkyl aromatic sulfates and sulfonates, and the like, and combinations or derivatives of these. VERSAWET™ and VERSACOAT™, NOVAMUL™, FAZEMUL™, FAZEWET™, MEGAMUL™, SUREMUL™, ONEMUL™, ACTIMUL RD™, and MUL-XT™ are non-limiting examples of commercially available emulsifiers manufactured and distributed by M-I, L.L.C. that may be used in the fluids and methods of this disclosure. Other suitable surfactants that are commercially available include SILWET™ series of emulsifiers such as L-77, L-7001, L7605 and L-7622, which are distributed by Union Carbide Chemical Company Inc.

In other embodiments, the emulsifier may be carboxylic acid-based emulsifier such as, for example, an emulsifier selected from dicarboxylic fatty acids, dimer acids, or dimers of fatty acids. Dicarboxylic fatty acids have the general formula HOOC—R—COOH, wherein R is an alkyl or alkenyl group containing from 10 to 50 carbon atoms, and in particular embodiments from 20 to 40 carbon atoms. In other embodiments, emulsifiers may be selected from the dimerization products of unsaturated dicarboxylic fatty acids, for example, such as products prepared by dimerization of unsaturated fatty acids containing from 8 to about 18 carbon atoms, including 9-dodecenoic(cis), 9-tetradecenoic (cis), 9-octadecenoic(cis), octadecatetraenoic acids and the like.

Organophilic clays, normally amine treated clays, may be useful as viscosifiers in the fluid compositions disclosed herein. Other viscosifiers and gellants, such as oil soluble polymers, polyamide resins, polycarboxylic acids and soaps may also be used. Attapulgite clay and sepiolite clay may also be used as viscosifiers. The amount of viscosifier used in the compositions may vary depending on downhole conditions, as understood by those skilled in the art. However, normally about 0.1% to 6% by weight range may be sufficient for most applications. VG-69™, VG-SUPREME™, VG-HT™, and VG-PLUS™ are organoclay available from M-I, L.L.C. (Houston, Tex.), and VERSA-HRP™ is a polyamide resin material available from M-I L.L.C. (Houston, Tex.) that may be used in the fluids and methods of this disclosure.

Fluid loss control agents may act by coating the walls of the well. Suitable fluid loss control agents may include, but are not limited to, modified lignites, asphaltic compounds, gilsonite, organophilic humates or tannins prepared by reacting humic acid or tannic acid with amides or polyalkylene polyamines, amine-treated tannins such as ONE-TROL-HT™, and latex polymers. In embodiments, the fluid loss control agent may be selected from one or more of VERSATROL™, VERSATROL™, VERSALIG™, ECOTROL™ family of products, ONETROL-HT™, EMI 789, and NOVATECH™ F, which are all commercially available from MI SWACO (Houston, Tex.).

Corrosion inhibitors may also be added to the drilling fluids disclosed herein to control the corrosion of the drilling equipment. Depending upon the type of corrosion encountered, the corrosion inhibitor may be organic or inorganic or some combination thereof. Non-limiting examples of corrosion inhibitors include phosphates, silicates, borates, zinc compounds, organic amines, benzoic acid, and benzoic acid derivatives, phosphate esters, heterocyclic nitrogen and sulfur compounds, organic acids, and the like. Non-limiting examples of commercially available corrosion inhibitors include sodium benzoate and benzotriazole.

Weighting agents or density materials suitable for use in wellbore fluid formulations in accordance with the present disclosure include, but are not limited to, hematite, magnetite, iron oxides, ilmenite, barite, siderite, celestite, dolomite, calcite, manganese oxides, halites and the like. In other embodiments, the micronized weighting agents may be coated with a dispersant.

In embodiments, the weighting agent may be coated, for example, with dispersants such as oleic acid and polybasic fatty acids, alkylbenzene sulphonic acids, alkane sulphonic acids, linear alpha-olefin sulphonic acids, phospholipids such as lecithin, including salts thereof and including mixtures thereof. Synthetic polymers may also be used, such as HYPERMER™ OM-1 (Imperial Chemical Industries, PLC, London, United Kingdom) or polyacrylate esters, for example. Such polyacrylate esters may include polymers of stearyl methacrylate and/or butylacrylate. In another embodiment, the corresponding acids methacrylic acid and/or acrylic acid may be used. One skilled in the art would recognize that other acrylate or other unsaturated carboxylic acid monomers (or esters thereof) may be used to achieve substantially the same results as disclosed herein.

The quantity of the coated or uncoated weighting agent added, if any, may depend upon the desired density of the final composition. Weighting agents may be added to result in a density of up to about 22 pounds per gallon (ppg). In other embodiments, the weighting agent may be added to achieve a density of up to 20 ppg or up to 19.5 ppg.

The method used in preparing wellbore fluids described herein is not critical. Conventional methods can be used to prepare the wellbore fluids in a manner analogous to those normally used, to prepare conventional oil-based drilling fluids. In one representative procedure, a desired quantity of oleaginous fluid such as a base oil and a suitable amount of carbon black materials are mixed together and the remaining components (if necessary) are added sequentially with continuous mixing. An invert emulsion of the present disclosure is formed by vigorously agitating, mixing or shearing the oleaginous fluid and the non-oleaginous fluid.

Although only few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method of electrically logging a section of a wellbore, comprising:
    circulating an oil-based wellbore fluid comprising a conductive carbon material therein, the oil-based wellbore fluid having a surface area loading factor of at least 2,000 lbm$^2$/gbbl and a conductivity of at most 0.01 S/m when measured at 20 kHz, within the wellbore while drilling the wellbore with a drill bit on a drill string;
    applying electrical current from a logging tool on the drill string above the drill bit; and
    collecting an electrical log of the portion of the wellbore that has had electrical current applied thereto.

2. The method of claim 1, wherein the electrical current is applied continuously as the wellbore is drilled by the drill bit.

3. The method of claim 1, further comprising:
    transmitting the electrical log to the surface.

4. The method of claim 1, wherein the electrical current is applied from the logging tool by at least one electrode thereon.

5. The method of claim 1, wherein the carbon material is a carbon black that has spheroidal primary particles from about 5 nm to about 150 nm in diameter.

6. The method of claim 1, wherein the carbon material is a carbon black wherein a circumscribing sphere encompassing a carbon black aggregate has a diameter from about 60 nanometers to 3 micrometers.

7. The method of claim 1, wherein the carbon material is a carbon black having a pore volume of at least about 200 cm$^3$ DBP/100 g carbon black and up to about 500 cm$^3$ DBP/100 g carbon black.

8. The method of claim 1, wherein the carbon material is a carbon black having a volatile content below about 1% by weight.

9. The method of claim 1, wherein the carbon material is present in the wellbore fluid in an amount of about 1 to 30 pounds per barrel.

10. The method of claim 1, wherein the oil-based wellbore fluid is an invert emulsion.

11. A system for electrically logging a section of a wellbore, comprising:
    a wellbore containing an oil-based wellbore fluid comprising a conductive carbon material therein, wherein the carbon material is a carbon black having a pore volume of at least about 200 cm$^3$ DBP/100 g carbon black and up to about 500 cm$^3$ DBP/100 g carbon black, and wherein the oil-based wellbore fluid has a conductivity of at most 0.01 S/m when measured at 20 kHz; and
    a logging tool capable of applying an electrical current to a portion of the wellbore on a drill string above the drill bit, the drill string being in the wellbore.

12. The system of claim 11, wherein the electrical current is applied from the logging tool by at least one electrode thereon.

13. The system of claim 11, wherein the oil-based wellbore fluid has a surface area loading factor of at least 2,000 lbm²/gbbl.

14. The system of claim 11, wherein the carbon material is a carbon black that has spheroidal primary particles from about 5 nm to about 150 nm in diameter.

15. The system of claim 11, wherein the carbon material is a carbon black wherein a circumscribing sphere encompassing a carbon black aggregate has a diameter from about 60 nanometers to 3 micrometers.

16. The system of claim 11, wherein the carbon material is a carbon black having a volatile content below about 1% by weight.

17. The system of claim 11, wherein the carbon material is present in the wellbore fluid in an amount of about 1 to 30 pounds per barrel.

18. The system of claim 11, wherein the oil-based wellbore fluid is an invert emulsion.

19. A method of electrically logging a section of a wellbore, comprising:
   circulating an oil-based wellbore fluid within the wellbore while drilling the wellbore with a drill bit on a drill string, wherein the oil-based wellbore fluid comprises a conductive carbon material therein, wherein the carbon material is a carbon black having a pore volume of at least about 200 cm³ DBP/100 g carbon black and up to about 500 cm³ DBP/100 g carbon black, and wherein the oil-based wellbore fluid has a conductivity of at most 0.01 S/m when measured at 20 kHz;
   applying electrical current from a logging tool on the drill string above the drill bit; and
   collecting an electrical log of the portion of the wellbore that has had electrical current applied thereto.

20. A method of electrically logging a section of a wellbore, comprising:
   circulating an oil-based wellbore fluid within the wellbore while drilling the wellbore with a drill bit on a drill string, wherein the oil-based wellbore fluid comprises a conductive carbon material therein, wherein the carbon material is a carbon black having a volatile content below about 1% by weight, and wherein the oil-based wellbore fluid has a conductivity of at most 0.01 S/m when measured at 20 kHz;
   applying electrical current from a logging tool on the drill string above the drill bit; and
   collecting an electrical log of the portion of the wellbore that has had electrical current applied thereto.

21. A system for electrically logging a section of a wellbore, comprising:
   a wellbore containing an oil-based wellbore fluid comprising a conductive carbon material therein, wherein the oil-based wellbore fluid has a surface area loading factor of at least 2,000 lbm²/gbbl and a conductivity of at most 0.01 S/m when measured at 20 kHz; and
   a logging tool capable of applying an electrical current to a portion of the wellbore on a drill string above the drill bit, the drill string being in the wellbore.

22. A system for electrically logging a section of a wellbore, comprising:
   a wellbore containing an oil-based wellbore fluid comprising a conductive carbon material therein, wherein the carbon material is a carbon black having a volatile content below about 1% by weight, and wherein the oil-based wellbore fluid has a conductivity of at most 0.01 S/m when measured at 20 kHz; and
   a logging tool capable of applying an electrical current to a portion of the wellbore on a drill string above the drill bit, the drill string being in the wellbore.

\* \* \* \* \*